May 15, 1956  J. V. WARD ET AL  2,745,725
FLUIDIZED SOLIDS CHEMICAL APPARATUS
Filed Nov. 13, 1951
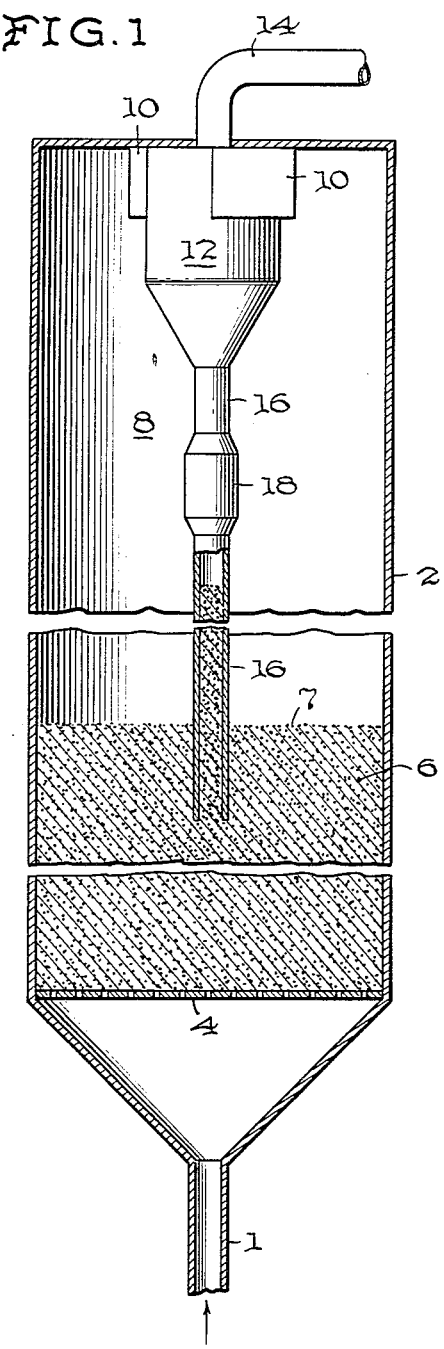
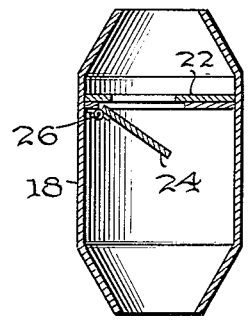
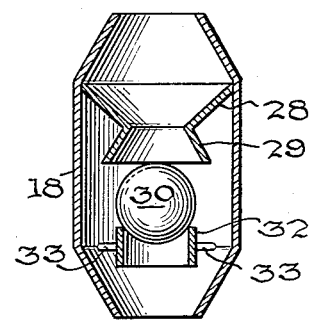
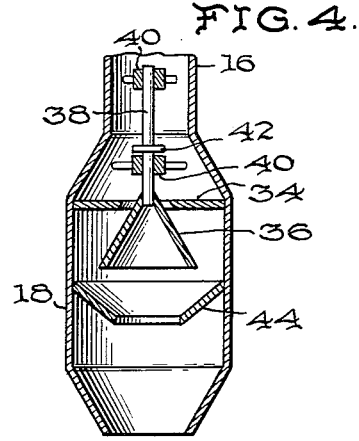
INVENTORS
JOHN V. WARD
BENJAMIN M. WEDNER
BY
*G. M. Houghton*
THEIR ATTORNEY

United States Patent Office 2,745,725
Patented May 15, 1956

2,745,725

FLUIDIZED SOLIDS CHEMICAL APPARATUS

John V. Ward, Oakmont, and Benjamin M. Wedner, Pittsburgh, Pa., assignors to Gulf Research & Development Company, Pittsburgh, Pa., a corporation of Delaware Application November 13, 1951, Serial No. 255,954

6 Claims. (Cl. 23—288)

This invention relates to an apparatus for effecting chemical reactions in the presence of a bed of fluidized solids. The apparatus includes a centrifugal gas-solids separator of the cyclone type, for removing entrained solids from the product vapors, and a conduit for returning separated solid particles from the separator to the bed of fluidized solids contained within the apparatus. More particularly, the invention relates to an improved apparatus of the type described which enables a reduction in the quantity of particles carried out of the apparatus with the effluent product vapors.

Systems involving the carrying out of chemical reactions in the presence of a fluidized bed of finely divided solid particles are well-known and have found wide acceptance in various fields, particularly in those involving the conversion of various chemical reactants by passage thereof through a fluidized bed of finely divided catalyst particles. In the field of petroleum refining, for example, fluidized catalytic processes have found extensive use.

Briefly, the fluidized solids technique involves the upward passage of a fluidizing gas through a bed of finely divided solid particles. The upward flow of gas through the solid particles provides an anti-gravitational force and produces a "hindered settling effect" within the particle bed. In the lower portion of the vessel the bed is of the so-called "dense-phase" type, while the particles in the upper portion or disengaging space are in a dilute phase. The particles are maintained in a suspended, turbulent state by the gas or vapor flow and may migrate more or less freely to all portions of the dense phase bed. The solid particles described may be catalytic.

The fluidized solids technique may also be employed in non-catalytic reactions such as the gasification of coal, in which hot gases are passed upwardly through a finely divided bed of coal particles, or the so-called "dry" hydrogenation of coal, in which heated, compressed hydrogen is passed through a fluidized bed of finely divided coal particles.

In all such processes the finely divided particles, in a state of "hindered settling," assume many of the characteristics of a liquid, i. e., as to flow properties, as to the exertion of a hydrostatic or "fluistatic" pressure, etc., hence the term "fluidized" solids.

In most instances it is desired to separate the product vapors from the solid particles before recovery of the former. To this end gas-solids separators have been employed in association with the vessel product outlet.

These separators are usually of the centrifugal or cyclone type. Such separators are provided with one or more tangential gas-solids inlets to a separation chamber, a gas outlet, and a particle return conduit for returning separated particles to the dense-phase bed of particles in the reaction zone. The particle return conduit is commonly called the "dip-leg."

Despite the provision of gas-solid separators in systems involving the fluidized solids technique carried out at elevated pressures, substantial quantities of fluidized solids may be found in the recovered products. This is undesirable, since it is normally necessary to remove the entrained solids from the products before the latter can be used, and also since it involves a substantial loss of solids from the reaction vessel. The loss of solids from the reaction vessel can in many instances result in substantial increases in the cost of operation, e. g., as where the particles are catalytic. The quantities of solids found in the product may be unusually large in connection with fluidized solids systems involving chemical reactions carried out both at elevated pressure and according to the fluidized fixed bed technique.

The presence of solid particles in the recovered product has been attributed to inefficient separating apparatus or to the lack of capacity of the separating apparatus used. However, systems have been designed with a specific view toward avoiding contamination of product vapors with entrained solids, the systems being provided with separating apparatus of the most effecient type and of a capacity calculated to insure substantially complete separation of the finely divided solid particles. Such systems have in many instances also been troubled with carry-over of solid particles with the product vapors. As stated above this has been particularly true in the case of chemical reactions carried out at relatively high pressures with a fluidized fixed bed of solid particles.

Close observation of this phenomenon has indicated that contrary to previous suppositions, the majority of these particles are not carried over in the product at a uniform rate, but rather in intermittent "blowouts" of short duration. These "blowouts" have been observed to occur during the normal course of a pressurized fluidized reaction. However, "blowouts" are encountered more frequently during transitional periods, such as during the charging of the fluidized solids to the reaction vessel, during initial fluidization, and during depressuring.

These and other observations have led to the belief that the majority of the fluidized particles are carried over in the product stream during sudden fluctuations in the pressure drop or pressure differential existing across the cyclone separator. When the pressure drop across the cyclone suddenly becomes abnormally large, i. e., when the normal pressure differential between the interior of the reactor and the product takeoff line suddenly increases, the dense-phase, fluidized solids in the dip-leg apparently are forced in a backward direction up through the separating chamber of the cyclone separator and into the product takeoff line.

It is the object of this invention to provide an apparatus of the type described which will prevent reverse flow of solid particles through the dip-leg of the separator and thus avoid loss of particles from the reactor into the product. It is a further object to provide an apparatus of the type described which may be converted from existing apparatus by inexpensive modification thereof. It is a more limited object to provide for use in an apparatus for the type described a durable, inexpensive, quick-acting valve means which is substantially immediately responsive to fluctuations in the pressure drop across the reactor outlet.

These and related objects are accomplished by our invention which comprises an apparatus for carrying out chemical reactions in the presence of a bed of fluidized solids. The apparatus is adapted to contain a dense phase bed of fluidized particles in the lower portion thereof and a dilute phase thereabove. Inlet means are provided for introducing fluidizing gas into the lower portion of the reaction vessel. Outlet means are provided for removing product vapors from the upper portion of said reaction vessel. A centrifugal gas-solids separator is associated with said outlet means, which separator is adapted to remove solid particles from product vapors. Conduit means are associated with said separator for returning separated particles into the lower portion of the vessel. A unidirectional, direct-acting valve means, of the type commonly known as a check valve, is positioned within said conduit. This valve means is quickly responsive to sudden fluctuations in the pressure drop across the separator means and is adapted to close when a sudden increase in the pressure drop across the separator exceeds that sufficient to cause appreciable reverse flow of particles through the conduit. In a preferred embodiment the valve is positioned within the conduit above the dense phase bed level within the conduit or dip-leg. The invention is useful in connection with chemical reaction carried out at elevated pressures, and particularly so in connection with processes of the type described which are carried out according to the fluidized fixed bed technique.

In the accompanying description and the attached drawings certain preferred embodiments of the invention have been presented. It is understood that these are by way of illustration only and are not to be considered as limiting.

Referring briefly to the attached drawing, there is shown in Figure 1 a schematic representation of a reaction vessel for carrying out a chemical reaction in the presence of a bed of fluidized solids. Figures 2, 3 and 4 are enlarged views of certain preferred pressure responsive valves for use in the apparatus of Figure 1. In the various figures like numerals refer to the same or similar elements.

The operation of the invention may be best understood from more particular reference to the drawings. For the sake of simplicity of explanation, the operation of the apparatus shown in the drawings will be described in connection with the fluidized fixed bed catalytic hydrogenation of a hydrocarbon oil.

Referring now to Figure 1 in detail, fluidizing gas enters the system through line 1. This gas may comprise one or more reactants to be converted. In the embodiment here described this gas may comprise a vaporized petroleum hydrocarbon oil in admixture with hydrogen. This mixture is preheated and compressed by means not shown.

From line 1 the fluidizing gas passes into the lower conical portion of reaction vessel 2. From the lower portion of this vessel the feed passes through the distributing member 4 into dense phase catalyst bed 6. Distributing member 4 may comprise a grating, a perforated plate, or other substantially equivalent distributing means, or, in some instances, be omitted.

The upward flow of the fluidizing gases through catalyst bed 6 causes catalyst particles contained therein to assume a fluidized state in which the particles migrate freely to all portions of the dense phase catalyst bed. During upward passage of the fluidizing gases through the fluidized bed of catalyst particles these gases come into intimate contact with the catalyst particles, and chemical action takes place.

Reaction products pass upwardly through dense phase bed level 7 into dilute phase 8 in the upper portion of reaction vessel 2. Product vapors and unreacted hydrogen, containing entrained catalyst particles, pass through tangentially positioned openings 10 into the separating chamber of cyclone separator 12, wherein the bulk of the entrained particles are separated from the vapors.

While only one cyclone separator has been illustrated in the drawing, the separation system may comprise a plurality of cyclone separators operating in parallel or in series. The invention is, of course, equally applicable to such systems.

Product vapors substantially free of entrained catalyst pass out of the system through product takeoff line 14. Catalyst particles separated in cyclone separator 12 are returned below the level of the dense-phase catalyst bed 6 through dip-leg or particle-return conduit 16. The dip-leg outlet necessarily extends beneath the dense-phase bed level to prevent excessive withdrawal of catalyst-laden product vapors therethrough.

As indicated in the drawing the dense-phase catalyst level in the dip-leg is above that in the reactor. This difference in level is due to the aforementioned normal pressure drop across the cyclone separator. The reactor pressure, being greater than that within the cyclone, exerts a "back-pressure" on the column of catalyst in the dip-leg of the cylone separator. This column of catalyst is therefore of a length and weight sufficient to balance the "back-pressure". When additional particles pass from the cyclone into the dip-leg, the equilibrium is upset and catalyst flows out of the dip-leg until the equilibrium is again reached.

The desired reaction pressure is maintained in the reactor by suitable valve means (not shown) positioned downstream of the reactor in line 14.

Upon the occurrence of an abnormally large pressure drop across the cyclone, i. e., between the interior of reaction vessel 2 and the reactor outlet, the dense-phase catalyst contained in conduit 16 as well as catalyst from dense-phase bed 6 tends to be forced up conduit 16 and into product outlet line 14.

Numeral 18 refers to the portion of conduit 16 housing the unidirectional valve means which is responsive to sudden increases in the pressure drop across the cyclone and which is adapted to close when the pressure drop exceeds that sufficient to cause appreciable reverse flow of the catalyst particles in conduit 16. This structure is positioned high in the dip-leg, just beneath the cyclone.

In Figure 2 there is shown an enlarged sectional view of one specific valve means suitable for the purposes of this invention. Element 22 comprises a substantially horizontally positioned valve-seat member, said member extending transversely across housing 18 and attached thereto. Numeral 24 refers to a valve closure member of the flap type which is pivotally mounted at hinge 26 on the lower surface of valve-seat member 22. Member 24 is advantageously constructed to permit opening to less than a vertical position. To this end, hinge 26 may be provided with a suitable stop. Valve member 24 is adapted to close off the passage through valve-seat member 22.

In the normal operation of the device shown in Figure 2, catalyst particles separated from product vapors normally flow downwardly through conduit 16 and through the passage in valve-seat member 22. When the pressure drop across the cyclone separator increases suddenly, the upward surge of the solids in conduit 16 acts on the lower surface of valve member 24 causing it to close. The dense-phase catalyst from bed 6 and conduit 16 is thereby prevented from passing out into the product takeoff line.

It may be noted that the abnormal pressure drops discussed do not cause any difficulty in connection with cyclone separator inlets 10. This is because an increase in the pressure drop across the cyclone separator merely causes product vapors to pass through inlets 10 more rapidly than usual. The more rapid passage of product vapors into cyclone separator through inlet 10, far from being objectionable, actually produces more efficient separation of particles therein due to the increased centrifugal force.

Figure 3 illustrates an alternative valve structure which may be employed in connection with the apparatus of Figure 1. In this structure there is provided a valve-seat member 28 having a passage therethrough. Member 28 is positioned transversely across housing 18 and attached thereto. The lower portion of valve-seat 28 is preferably in the form of an outwardly flared, flanged member in order to provide a suitable ball-receiving surface. Numeral 30 refers to a freely movable ball-valve. Numeral 32 refers to a hollow, open-ended, cylindrical ball-rest member attached to the inner surfaces of housing 18 by means of pins 33. The opening in valve seat member 28, ball 30, and ball-rest 32 are in substantially vertical alignment.

In normal operation, solids from separator 12 pass downwardly through the opening in valve seat member 28, around ball 30 and ball-rest 32, through the openings between the pins 33, and into lower portion of the particle-return conduit, from which the particles are returned to the dense-phase of the catalyst bed. When an abnormal increase in the pressure drop across the cyclone separator occurs, the upward surge of catalyst particles through particle-return conduit 16 forces ball-valve 30 out of ball-rest 32 and into the flared receiver of valve-seat member 28.

Figure 4 illustrates another suitable valve which may be employed in the apparatus of Figure 1. In this figure numeral 34 denotes a valve seat member positioned transversely across enlarged portion 18 of conduit 16 and attached to the inner surfaces thereof. The periphery of the opening in valve seat member 34 is preferably tapered or countersunk on its lower side to produce a snug fit when engaged with conical valve closure member 36. In the modification illustrated, valve closure member 36 comprises a hollow, conical member, positioned vertex upward and adapted to seat in the opening in valve seat member 34 from beneath. Valve stem 38 is attached to the conical valve closure member at the vertex of the latter and extends in an upward direction. Bearing members 40 surround valve stem 38 loosely and serve to limit the horizontal movement of the valve stem 38 and attached conical valve closure member 36. A collar 42, attached to valve stem 38, limits the downward movement of stem 38 and valve closure member 36.

In normal operation valve closure member 36 is in the open position as shown due to the force of gravity. Catalyst particles separated from product vapors in cyclone separator 12 pass downwardly through conduit 16, through the opening in valve seat member 34, between housing 18 and the conical surfaces of valve closure member 36, and thence downwardly into the lower portion of conduit 16. When a sudden increase in the pressure drop across the cyclone occurs, the upward surge of solids through the lower portion of conduit 16 and lower portion of housing 18 causes positive engagement of valve member 36 with valve seat member 34, whereby reverse flow of catalyst particles is prevented.

In the modification shown in Figure 4 the bearing members 40 are preferably positioned as illustrated above valve seat member 34 to prevent fouling thereof by the upwardly flowing, dense stream of catalyst particles. In addition, it is desirable to provide a baffle member 44 in the position illustrated. This baffle member is constructed in the form of a hollow, truncated cone, positioned base upward, in order to direct the main force of the upwardly flowing catalyst particles into the under surface of valve closure member 36.

Each of the particular structures illustrated in Figures 2, 3 and 4 provides a simple, inexpensive, durable quick-acting valve, which is responsive to the reverse flow or surge of catalyst particles resulting from a sudden, abnormally large pressure drop across the cyclone. The invention may easily be incorporated into existing apparatus by simple modification of the return leg of the cyclone separator employed.

It will be noted from the structure illustrated in Figure 1 that the pressure responsive valve means employed is positioned in conduit 16 at a level above the normal dense phase catalyst level contained therein. This is a preferred form of the invention, since it insures against improper seating caused by catalyst particles between the valve closure member and the valve seat.

The invention is useful in connection with any chemical reaction carried out at elevated pressure in the presence of a fluidized bed of solids. The invention has greatest utility in connection with reactions of the type described which are in addition carried out according to the fluidized fixed bed technique. Specific examples of chemical reactions which may be carried out at elevated pressure which may also be performed in the presence of a fluidized-fixed of solids and to which the invention is applicable are, destructive hydrogenation or hydrocracking of hydrocarbon oils, hydroforming of hydrocarbon oils, hydrocarbon synthesis reactions, "dry" hydrogenation of finely divided coal particles and the gasification of finely divided coal.

While I do not intend to be limited to any particular theory of operation, it is my belief that the difficulties experienced with carryover of particles in previously employed apparatus are due to the peculiar effects of elevated pressure upon the functioning of the centrifugal gas-solids separators.

More specifically, in ordinary fluidized solids operations carried out at or near atmospheric pressure, the pressure drop across the cyclone separator is of the order of four inches of water. The equation for this pressure drop is of the type $\Delta P = K\rho V^2$, where $\Delta P$ = pressure drop, $K$ = constant, $\rho$ = gas density, and $V$ = gas velocity.

Where the reaction pressure is increased while the gas velocity remains constant, it will be seen that $\Delta P$ must increase, since the gas density $\rho$ increases with increased pressure. Thus, for example, a reaction pressure of 750 p. s. i. g. may result in a pressure drop across the cyclone of 50 or 75 inches of water.

This increased difference in pressure forces catalyst further up the dip-leg than is customary in units operated at atmospheric pressure. For example, where the dip-leg column of catalyst may be only a few inches deep in a unit operated at atmospheric pressure, the column may extend nearly up to the cyclone separator at substantially elevated pressures. In the latter instance, a relatively slight increase in the pressure drop across the cyclone may easily force catalyst from the dip-leg through the cyclone and into the product outlet line.

The sudden fluctuations in the pressure drop across the cyclone not only have a more detrimental effect in units operated at elevated pressure, but in addition occur more frequently in such operations. This may be due to fluctuations in the compressor and/or in the temperature of the gases and vapors within the reactor, or due to other causes.

As mentioned, catalyst carry-over in units operated at elevated pressure is a greater problem where the processing cycle involves frequent transitional periods, such as depressuring, initial fluidization, etc. These transitional operations usually occur infrequently in fluidized moving bed units but may be repeated often in reactions involving the fluidized fixed bed technique.

During a depressuring step, for example, the gases and vapors expand with a resultant decrease in density and an increase in velocity. Since the gas velocity V appears as a squared term in the equation $\Delta P = K\rho V^2$, the net effect is an increase in the pressure drop across the cyclone. This in turn tends to force the catalyst column in the dip-leg to a higher level. The catalyst column may in this way either be forced through the cyclone and into the product takeoff line or merely be forced to a level where a slight increase in the pressure drop will cause the same result.

It is emphasized that the increases in pressure drop across the reaction vessel outlet concerned here are the sudden, temporary increases of varying degree. Any sustained shift in the pressure equilibrium would eventually be compensated for by other pressure control equipment in the system. The bulk of the catalyst carry-over occurs during the time lag before the normal pressure differential is resumed. For this reason the valves employed in the dip-leg of the separator must be of the direct-acting type, as shown, in order to cut off immediately reverse flow of solid particles. By a "direct-acting" valve is meant one which responds directly to the surge of solids rather than one which is operated indirectly by pressure controlled mechanisms or like instruments. Valves of the latter type are unsuitable for the purpose of this invention, since a time lag occurs before operation thereof. During such time lags substantial quantities of solid particles may be carried over into the product takeoff line.

To additionally insure immediate valve action, the valve is preferably constructed of light metal or alloys. In the modification involving a ball-valve, the ball may be constructed of metal or ceramic material, but should in any event be sufficiently light to be lifted and held in place by the surge of back-flowing particles. In the modification shown in Figure 4, the valve may be made light by employing a hollow valve closure member, as shown.

The reaction conditions, catalysts or other solid particles, employed, etc., are those normally employed in connection with the particular reaction being carried out. These catalysts, conditions, etc. are well-known in the art and need not be discussed in detail, since they form no part of our invention.

It is understood that the various embodiments discussed may be varied somewhat without departing from the spirit of the invention. Thus the centrifugal separator need not be positioned within the reactor, as shown in the drawings, but may also be located exteriorly thereof in the form of a separate structure, so long as the particle-return conduit extends into the dense-phase bed of fluidized solids in the lower portion of the reaction vessel. The former structure is preferred, however, particularly where relatively high pressures are employed, since this structure permits the separator to be of relatively light construction. The invention may be utilized in connection with either fluidized moving bed or fluidized fixed bed processes operated at elevated pressure. The invention is of distinct advantage in connection with fluidized fixed bed processes (i. e., those in which catalyst is neither removed nor added in appreciable quantity throughout the on-stream period), since such processes may involve periodic transitional periods of the type causing fluctuations in the pressure drop across the reactor outlet.

Among the advantages produced by the invention is the fact that it provides a simple, inexpensive, durable, quick-acting means for preventing the carry-over of solid particles in the product stream, due to reverse flow of particles through the dip-leg of the separator. Presently existing apparatus may easily and inexpensively be modified to incorporate the principles of the invention.

What we claim is:

1. Apparatus for carrying out a chemical reaction in the presence of a bed of fluidized solids, comprising a vessel adapted to contain a dense phase of fluidized solid particles in its lower portion and a dilute phase in the upper portion, inlet means for introducing fluidizing gas into the lower portion of said vessel, outlet means for removing product vapors from the upper portions of said vessel, a centrifugal gas-solids separator in association with said outlet means and adapted to remove solid particles from said product vapors, conduit means in association with said separator and extending beneath the dense-phase level for returning separated solid particles into the lower portion of the vessel beneath the dense phase level, unidirectional, direct-acting, normally open valve means positioned within said conduit, said valve means being responsive to sudden increases in pressure drop across the separator, and being adapted to close when the pressure drop exceeds that sufficient to cause appreciable reverse flow of particles through said conduit.

2. Apparatus for carrying out a chemical reaction in the presence of a bed of fluidized solids comprising a vessel adapted to contain a dense phase of fluidized solid particles in its lower portion and a dilute phase in its upper portion, inlet means for introducing fluidizing gas into the lower portion of said vessel, outlet means for removing product vapors from the upper portion of said vessel, a centrifugal gas-solids separator in association with said outlet means and adapted to remove solid particles from said product vapors, conduit means in association with said separator and extending beneath the dense-phase level for returning separated solid particles into the lower portion of the vessel beneath the dense phase level, unidirectional, direct-acting, normally open valve means positioned within said conduit, said valve means being responsive to sudden increases in the pressure drop across the separator and being adapted to close when the pressure drop exceeds that sufficient to cause appreciable reverse flow of particles through said conduit, said valve means being positioned above the normal particle level within said conduit means.

3. The apparatus of claim 2 in which said unidirectional valve means comprises a valve seat member positioned transversely of the interior of the conduit, attached thereto, and having an opening therein, pivotally mounted valve closure means in association with said valve seat member and adapted to close off said opening from the lower side.

4. The apparatus of claim 2 in which the unidirectional valve means comprises a valve seat member positioned transversely of the interior of said conduit, attached thereto, and having an opening therein, a freely movable ball-valve member positioned beneath said valve seat member, a ball-rest member positioned beneath said ball and adapted to receive said ball and to permit transmittal of pressure to the lower surface of said ball, said ball-rest, ball, and the opening in said valve seat member being in substantially vertical alignment.

5. The apparatus of claim 2 in which said unidirectional valve means comprises a valve seat member positioned across the interior of said conduit and having an opening therein, a hollow, single conical valve closure member positioned vertex upward and adapted to close the opening in said valve seat member from the lower side thereof, a valve stem associated with said conical member at the vertex thereof and extending vertically therefrom, guide means positioned above the valve seat member and adapted to restrict the horizontal movement of said valve stem, and means limiting the downward movement of said stem and said conical valve closure member.

6. Apparatus for carrying out a chemical reaction in the presence of a bed of fluidized solids comprising a vessel adapted to contain a dense phase suspension of fluidized solid particles in its lower portion and a dilute phase suspension in its upper portion, inlet means for introducing gas into the lower portion of said vessel, outlet means for removing product vapors from the upper portion of said vessel, a centrifugal gas-solids separator in association with said outlet means and adapted to remove solid particles from said product vapors, conduit means in association with said separator and extending beneath the dense-phase level, which conduit means is adapted to return separated solid particles into the lower portion of the vessel beneath the level of the dense-phase suspension, a direct-acting, normally open check valve positioned within said conduit, said check valve comprising a valve seat member positioned transversely of the interior of said conduit and attached thereto, said valve seat member having an aperture therethrough, a valve member beneath said valve seat member, said valve member being responsive to sudden increases in the pressure drop across the separator and being adapted to close off said aperture from the lower side when said pressure drop exceeds that sufficient to cause appreciable reverse flow of particles through said conduit.

(References on following page)

References Cited in the file of this patent

UNITED STATES PATENTS

| Number | Name | Date |
|---|---|---|
| 1,484,298 | Collins | Feb. 19, 1924 |
| 1,710,214 | Hassold | Apr. 23, 1929 |
| 1,761,627 | Hine | June 3, 1930 |
| 2,327,175 | Conn | Aug. 17, 1943 |
| 2,378,607 | Watts | June 19, 1945 |
| 2,490,798 | Gohr et al. | Dec. 13, 1949 |
| 2,541,186 | Anderson | Feb. 13, 1951 |
| 2,688,588 | Beam | Sept. 7, 1954 |